United States Patent [19]

Cuomo et al.

[11] 4,448,487
[45] May 15, 1984

[54] PHOTON ENERGY CONVERSION

[75] Inventors: Jerome J. Cuomo, New York; Thomas H. DiStefano, Bronxville; Jerry M. Woodall, Mt. Kisco, all of N.Y.

[73] Assignee: International Business Machines Corporation, Armonk, N.Y.

[21] Appl. No.: 43,398

[22] Filed: May 29, 1979

Related U.S. Application Data

[63] Continuation of Ser. No. 723,857, Sep. 16, 1976, abandoned.

[51] Int. Cl.$^3$ .............................................. G02B 1/10
[52] U.S. Cl. ..................................... 350/164; 126/400; 126/901; 204/56 R
[58] Field of Search ................ 350/164; 126/400, 901; 136/206; 204/56 R

[56] References Cited

U.S. PATENT DOCUMENTS

| | | | |
|---|---|---|---|
| 3,176,679 | 4/1965 | Langley | 126/450 |
| 3,533,850 | 10/1970 | Tarneja et al. | 350/164 |
| 3,751,303 | 8/1973 | Kittl | 136/206 X |
| 3,864,224 | 2/1975 | Cotton et al. | 204/56 R |
| 3,949,463 | 4/1976 | Lindmayer et al. | 350/164 X |
| 4,005,698 | 2/1977 | Cuomo et al. | 428/141 |
| 4,171,993 | 10/1979 | Albertson | 126/901 X |

OTHER PUBLICATIONS

Cuomo et al., "A New Concept for Solar Energy Thermal Conversion", *Applied Physics Letters*, vol. 26, No. 10, May 1975, pp. 557–559.
Okuyama, "Dendritic Needles of Tungsten . . .", *Japanese Journal of Applied Physics*, vol. 14, No. 11, Nov. 1975, pp. 1811–1812.
Cuomo et al., "Photothermal Device . . .", *IBM Tech. Discl. Bulletin*, vol. 18, No. 7, Dec. 1975, p. 2385.
Gittleman, "Application of Granular Semiconductors to Photothermal Conversion . . .", *Applied Phys. Ltrs.*, vol. 28, No. 7, Apr. 1976, pp. 370–371.

*Primary Examiner*—John D. Lee
*Attorney, Agent, or Firm*—Alvin J. Riddles

[57] ABSTRACT

Photon energy can be efficiently absorbed by a material having a reflectivity control surface region wherein the index of refraction, the thickness, and the contour of the external surface of the reflecting control surface region operate to curtail all reradiation components.

7 Claims, 6 Drawing Figures

HILLOCK TUNGSTEN

DENDRITIC TUNGSTEN

PHOTON ENERGY CONVERSION

This is a continuation, of application Ser. No. 723,857 filed Sept. 16, 1976 (now abandoned).

BACKGROUND OF THE INVENTION

The efficiency of conversion of photon energy into thermal energy is dependent upon the relationship of the portion of the photon energy absorbed to the portion of heat that is emitted or reflected. Metals which have good thermal properties, absorb or are non-transparent at essentially all wavelengths, while at the same time they also reflect much of the energy in which they are exposed. Generally, highly reflective surfaces have both low absorbtivity and low emissivity. Since absorbtivity and emissivity are interrelated, the art thus far has developed long the lines of multilayered structures wherein one layer has one desirable property and another layer another desirable property. An example of such structure is shown in U.S. Pat. No. 3,920,413. Such structures however, are subject to structural limitations in that the effect of one layer may interfere with the optimum benefit from another. Further, the manufacture of multilayered structures frequently involves many processing considerations in fabrication.

DESCRIPTION OF THE INVENTION

The invention involves a reflectivity control surface region for photon absorbing materials such that the reflection from the photon absorbing material surface is attenuated and reflected by the operation of the criteria selected of the radiation control surface region contour so that the net reflection effect is sharply curtailed. Anodically oxidized tungsten with a particular type of rough surface can meet the criteria of the invention so that a superior photon absorber and a superior converter of solar energy into heat results.

REFERENCE TO RELATED PATENT

In U.S. Pat. No. 4,005,698 a new surface is provided which is a geometric maze of aligned needle-like protrusions with dimensions and spacing related to visible light wavelength. The material of U.S. Pat. No. 4,005,698 provides a most efficient photon energy absorber than has been seen heretofore in the art and when the reflectivity control surface region is applied thereto an even more improved photon energy absorber is produced that can absorb 99.94% of incident light at a particular wavelength.

DETAILED DESCRIPTION OF THE INVENTION

The efficiency of conversion of light energy into heat may be expressed as:

$$\text{Efficiency} = \frac{\text{Energy absorbed} - \text{Energy reradiated}}{\text{Energy-in.}} \quad \text{Equation 1}$$

Figure 1:
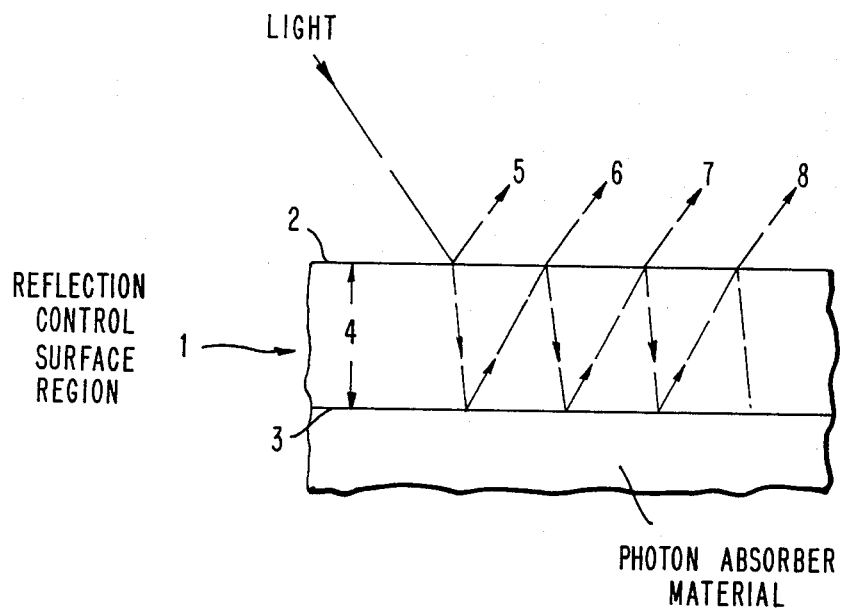
FIG. 1 is a schematic view of the optical operation of the invention.

Referring to FIG. 1, a schematic view is presented showing the effect of the invention on the absorption and reflection of light. In FIG. 1, a radiation control surface region 1 is shown as an optically transparent material for the desired wavelength having a surface 2 parallel to the surface 3 of the photon absorbing material and having a thickness 4 related to the wavelength of the incident light. The optical and physical specifications of the reflection control surface region are interrelated as is set forth below.

For purposes of definition reflection means energy that impinges and is returned without entering the material in contrast to reradiation where the energy enters the material and by virtue of a change in temperature of the material energy is emitted by the material.

In FIG. 1 the light striking the surface 2 has an initial reflectivity component 5 and a series of decreasing subsequent components, three of which are illustrated as elements 6, 7, and 8. In operation, the light reflected from the surface 3 is enhanced or diminished by interference with the light returning from surface 2 from a previous reflection.

The following description is set forth using an oxide of a metal photon absorber material as an illustration although it will be apparent in the light of the principles described that coatings other than oxides as well as materials other than the composition of the base metal may be provided to achieve the desired properties.

In FIG. 1 the first reflection coefficient (element 5) may be expressed as follows:

$$\text{Initial reflection coefficient (element 5)} = (r_1)^{\frac{1}{2}} = \frac{1 - N_o}{1 + N_o} \quad \text{Equation 2}$$

where
$r_1$ is air-to-oxide reflectivity, and
$N_o$ is the index of refraction of the oxide.

Similarly the reflection coefficient of (element 6) may be expressed by Equation 3.

$$\text{Reflection coefficient of (element 6)} = (r_2)^{\frac{1}{2}} = \frac{-N_m + N_o - ikm}{N_m + N_o + ikm} \quad \text{Equation 3}$$

where
$r_2$ is oxide-to-metal reflectivity.
$N_m$ is index of refraction of metal.
$k_m$ is extinction coefficient of the metal.
i is $\sqrt{-1}$.

Thus the relationship of reflection coefficients for the components 5, 6, 7 and 8, etc. is as follows:
$5 = r_1$
$6 = r_2(1-r_1)^2$
$7 = r_2^2 r_1 (1-r_1)^2$
$8 = r_2^3 r_1^2 (1-r_1)^2$ Hence the reflectivity of the control surface 1 is as expressed in Equation 4

$$R_{TOTAL} = \left| r_1 + r_2 e^{4\pi ed/\lambda} \frac{(i - r_1)^2}{1 - r_1 r_2} \right|^2 \quad \text{Equation 4}$$

where
d is the thickness 4 and,
λ is the wavelength, and
| | indicate absolute values.

$$\left| |r_1| - \left| r_2 \frac{(1-r)^2}{1 - r_1 r_2} \right| \right|^2 \lesssim \text{DESIRED REFLECTIVITY AT MIN. } \lambda \quad \text{Equation 5}$$

This is approximately $$||r_1| - |r_2||^2 \lesssim \text{DESIRED REFLECTIVITY AT MIN. } \lambda \quad \text{Equation 6}$$

For applications involving the conversion of solar energy into heat the desired reflectivity at minimum wavelength (λ MIN) should be less than 0.05.

The desirable goal is for $R_{TOTAL}$ to be as small as possible and the reflectivity of the surface 2 is nearly equal to the reflectivity of the surface 3.

The criteria for a radiation control surface region 1 for a desired wavelength may be expressed as follows:

$$\left| \left| \frac{1 - N_o}{1 + N_o} \right| - \left| \frac{N_m - N_o - ik_m}{N_m + N_o + ik_m} \right| \right|^2 \lesssim \text{Desired reflectivity at min } \lambda \quad \text{Equation 7}$$

In essence as may be seen from Equation 7, the criteria of the reflection control surface region of the invention operate to equate the effect of the reflection components of surface 3 with that of the initial reflection of the incident light from surface 2.

Figure 6:
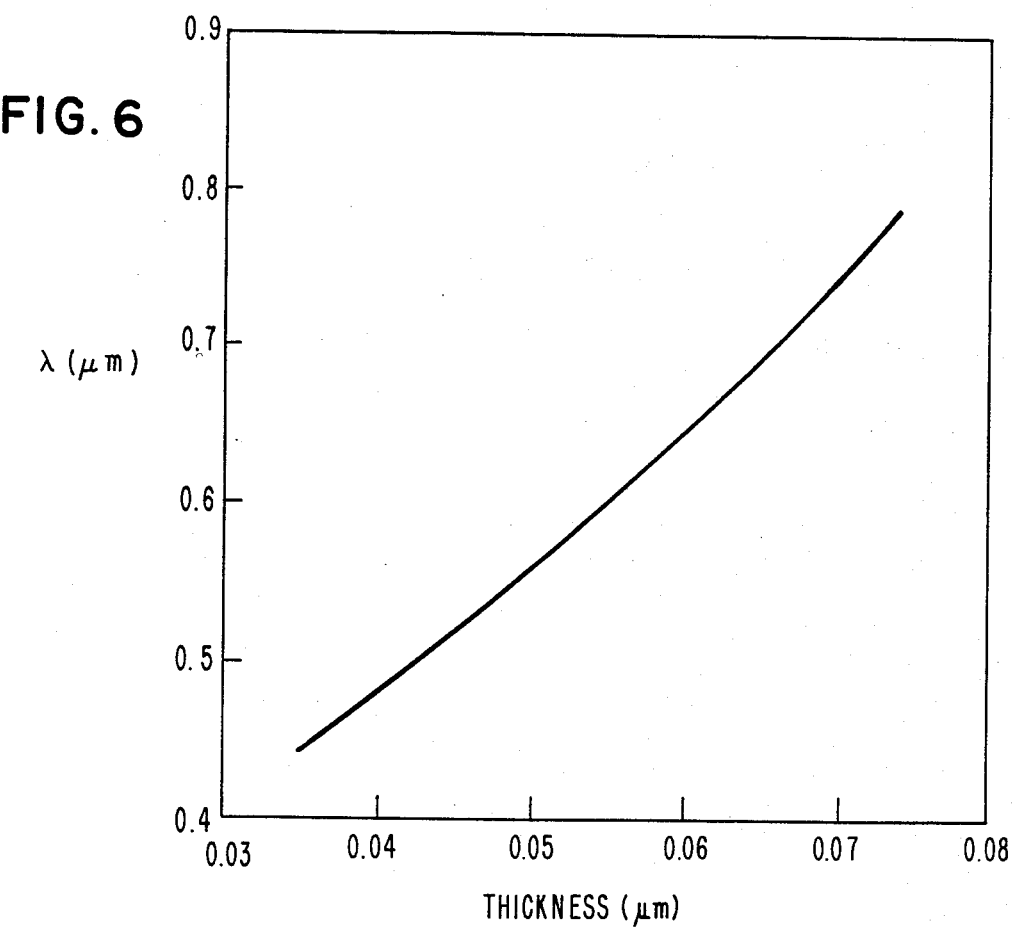
FIG. 6 is a plot of thickness of surface region of tungsten oxide on tungsten vs. wavelength at the maximum of the absorption.

The thickness d (element 4 in FIG. 1) enters in two ways. It is part of the calculations of Equation 4 establishing the desired reflectivity at the wavelength of the minimum, and then as will be described in FIG. 6, it permits movement of the wavelength minimum.

In such a relationship it is apparent that a desirable goal is to absorb all radiation in the desired band of wavelength, to reflect all undesired wavelengths, and to keep the desired wavelength energy that is reflected to a minimum. This is done in accordance with the invention by providing wavelength selective reflection control surface region at the surface of a photon absorbing material such that the air-to-region 1 reflectivity, thickness, and contour; the index of refraction of region 1; and the index of and extinction coefficient of the photon absorber material all interact to curtail the light reflected from the photon absorbing material.

The surface contour is best chosen to be rough or textured such that light which is incident normal to the surface must substantially undergo more than one reflection before it can escape from the surface. This roughened or textured surface, in combination with the reflection control layer, produces an absorptance which is greater and which covers a larger band of wavelength than a simple anti-reflective coating on a smooth metal. For example, an anti-reflective coating on a smooth metal has a reflectance of $P_{TOTAL}$ which varies with wavelength, while an anti-reflective coating on a roughened or textured surface, in which light suffers two bounces before being returned, has a reflectance of $R_{TOTAL}^2$, which is less than $R_{TOTAL}$.

The reflection control region may be contrasted with passivating coatings by the fact that in the passivating coating the primary concern is chemical protection of inertness and therefore the choice of materials is directed at this purpose.

Figure 2:
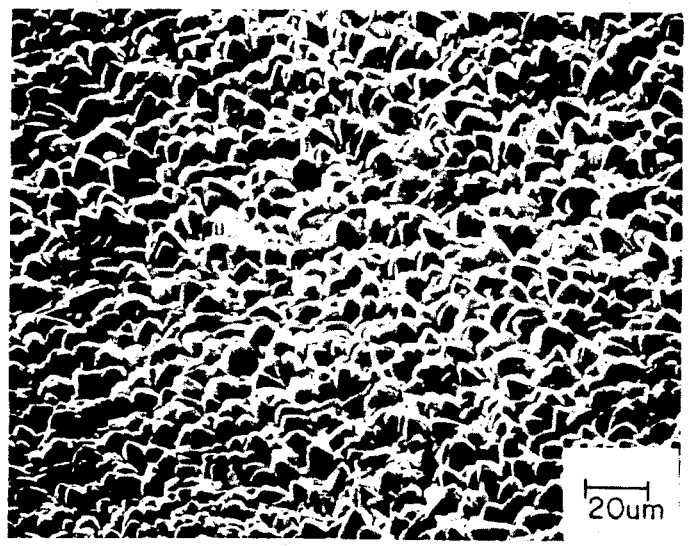
FIG. 2 is a photomicrograph of a hillock-type of tungsten surface.
Figure 3:
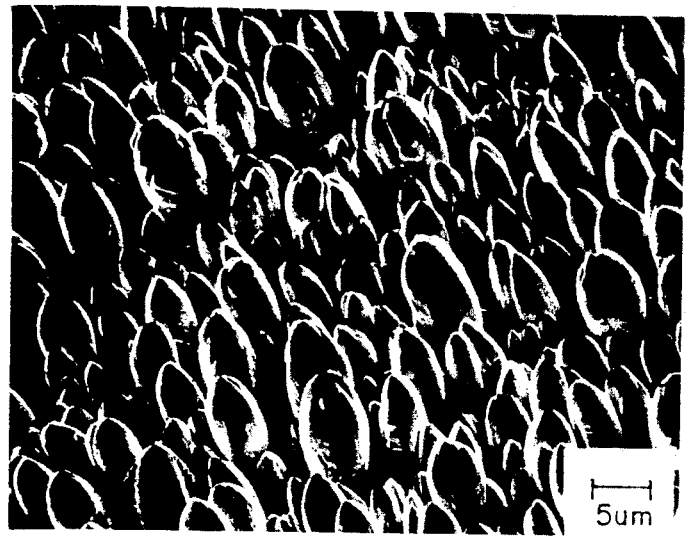
FIG. 3 is a photomicrograph of a dendritic-type of tungsten surface.

Referring next to FIGS. 2 and 3 there are shown photomicrographs of tungsten surfaces having respectively increasing degrees of absorptivity. The surface of FIG. 2 is known as a hillock surface well known in the art and the surface of FIG. 3 is known as a dendritic surface as set forth in the referenced U.S. Pat. No. 4,005,698. Both surfaces are prepared by the technique of Chemical Vapor Deposition, well known in the art. The hillock structure is much thinner than the dendritic structure and hence is less expensive. The degree of magnification is shown on the photomicrograph. The radiation control surface region of the invention when fabricated in connection with surfaces such as the surfaces of the type of FIGS. 2 and 3 and with a flat surface not illustrated results in an abrupt decrease in total reflectivity for a particular wavelength which is selectable in accordance with the criteria set forth above.

Figure 4:
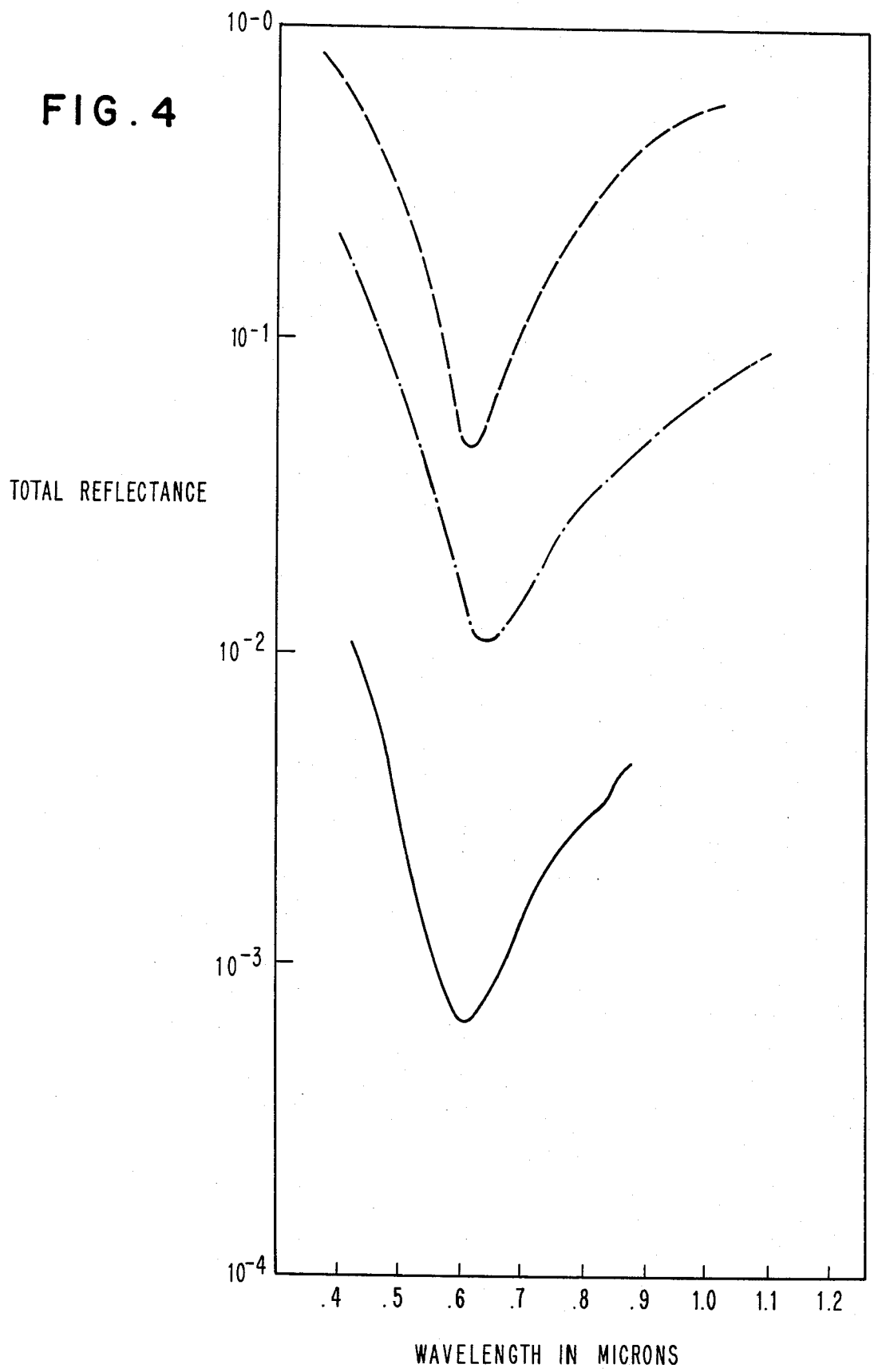
FIG. 4 is a plot of light wavelength vs. reflectance illustrating the effect of the invention on three types of surfaces.

This is illustrated in the graph of FIG. 4 wherein Total Reflectance for normally incident light is plotted against wavelength in microns. Three curves are shown. A dotted curve is shown for flat tungsten, a dashed curve is for hillock material in FIG. 2 and the solid curve is for the dendritic material in FIG. 3. It should be noted that the radiation control surface region in accordance with the invention produces a peak in absorption in the vicinity of 0.62 microns. This wavelength is accepted in the art as being at or near the peak in solar emissivity. From the logrithmic scale of FIG. 4 it may be seen that the dendritic material of FIG. 3 when provided with the radiation control surface region of the invention absorbs 99.94% of the incident light at 0.55 microns.

Figure 5:
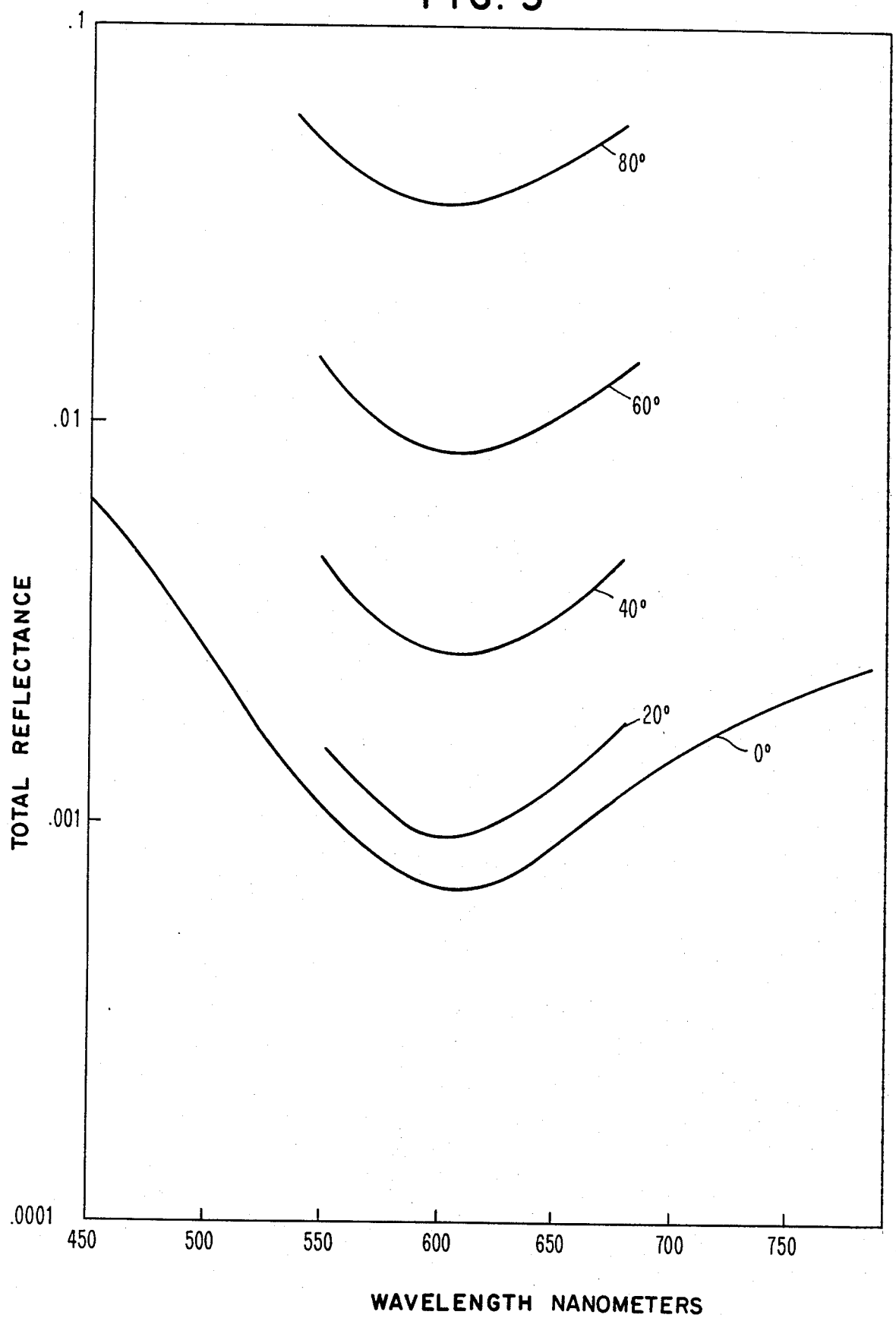
FIG. 5 is a plot of light wavelength vs. reflectance illustrating the effect of the invention on reflectance for several angles of incidence of the light.

Referring next to FIG. 5 the effect of the invention for varying directions of incident light on a dendritic surface is shown.

In the graph of FIG. 5 total reflectivity is plotted against wavelength in nanometers for 0°, 20°, 40°, 60° and 80° angle of incidence of light. In each instance the absorption peak appears at approximately the same wavelength.

In accordance with the invention, fabrication of the reflection control surface region 1 of FIG. 1 is accomplished by providing the region 1 material contoured to the surface configuration of the photon absorbing material, with the desired parameters which are: the reflection coefficient from the surface 2 of the region 1 material is approximately equal to the reflection coefficient of the interface 3 between the photon absorbing material and region 1. These reflectivity coefficients are related to the index of refraction of region 1 material, the index of refraction of the photon absorbing material, and the extinction coefficient of the photon absorbing material. These are well established parameters in the art and are available in most standard handbooks. In order to enable one skilled in the art to minimize experimentation however, a set of specific values for equations 2-7 are provided in the Table 1 for the material $WO_3$ as the radiation control surface region 1 on dendritic W as shown in FIG. 3.

TABLE 1

|  | W | WO$_3$ | W—WO$_3$ |
|---|---|---|---|
| m | 3.43 | 2.26 | — |
| k | 2.96 | 0.0 | — |
| $|r_1|$ | — | — | 0.386 |
| $|r_2|$ | — | — | 0.496 |
| $||r_1|-|r_2||^2$ | — | — | 0.012 |

The fabrication of the radiation control surface region 1 is particularly adaptable to processes that form chemical compounds of the photon absorber material. Such processes use the material of the photon absorber material as one component, form in a conformal contour with the surface and are generally easily controllable for the desired thickness range of the surface control region. Some examples of such processes are anodization or oxidation, nitridation and carburization. One particularly controllable fabrication approach is the technique of anodization where the material of the photon absorber and the region formed so permit in accordance with the criteria of the invention set forth above. In this technique an oxide is frequently formed that limits current flow so that thickness of the region is precisely correlated with voltage. Some metals forming advantageous oxides useful in accordance with the invention are W, Mo, Hf, V, Ta and Nb.

Again in order to facilitate the practice of the invention, Table 2 sets forth the relationship between the thickness dimension 4 of FIG. 1 and anodization voltage for the material WO$_3$ on W.

TABLE 2

| VOLTAGE In Volts | THICKNESS In μm |
|---|---|
| 20 | 0.035 |
| 25 | 0.045 |
| 30 | 0.055 |
| 35 | 0.065 |
| 40 | 0.075 |

As an illustration of the spectacular advantages of the invention the following test results of a particular embodiment are provided.

A hillock tungsten surface as illustrated in FIG. 2 was anodized in a phosphoric acid bath at a voltage of 30 V. In this technique the WO$_3$ region stops the anodic reaction at a specific thickness which is controlled by the applied voltage. The rate of "absorptivity" to incident radiation "over" "hemispherical emissivity," in other words, $(\alpha/\epsilon)$ for this surface at 150° C. is 3.9. In the following table the efficiency as computed by Equation 1 for this surface is compared to that of a standard blackbody for varying temperature.

TABLE 3

| T | EFFICIENCY IN % | | RERADIATION IN WATTS PER SQ. CM | |
|---|---|---|---|---|
|  | TUNGSTEN | BLACKBODY | TUNGSTEN | BLACKBODY |
| 50° C. | 80% | 32% | 0.015 | 0.063 |
| 75° C. | 75% | 12% | 0.020 | 0.083 |
| 100° C. | 68% | 0 | 0.027 | 0.1125 |
| 150° C. | 51% | 0 | 0.044 | >0.1 |
| 200° C. | 26% | 0 | 0.069 | >0.1 |

From the table it may be seen that efficiencies of greater than 50% are realized for temperatures up to 150° C.

One major benefit is that the technique of the invention now makes possible a new photon absorbing material in that antireflective coating benefits may now be imparted to substrates having photon absorbing properties derived from surface irregularities.

For most solar energy conversion applications it is desirable to have photon absorbers which absorb greater than 90% of the solar spectrum. Neither flat metal, rough metal nor simple antireflective coatings thereon can achieve this result. However, in combination with the reflection control surface region of the invention applied to particular types of textured or rough metal surfaces such as tungsten low reflectance over a broad spectral region can be achieved. Textured or roughened surfaces, which normal incident light experiences multiple reflections off the surface of the reflection control layer, have been found to yield the desired absorptance for the solar spectrum. In contrast antireflection coatings on smooth metals have an absorptance which covers only a small portion of the solar spectrum.

While the invention has been shown in connection with a specific embodiment of anodized tungsten it will be apparent to one skilled in the art that in the light of the principles set forth many specific embodiments can be realized.

What is claimed is:

1. A photothermal absorbing member comprising a body of photon absorbing material with an index of refraction and an extinction coefficient for light impinging thereon and having;

a surface contour insuring multiple reflections of incident light;

a contour conforming reflection control region material with an index of refraction of light at a particular wavelength impinging thereon covering said body and positioned between said photon absorbing material and a source of incident light;

said photon absorbing material exhibiting a first reflectivity at said particular wavelength of light;

said reflection control region exhibiting a second reflectivity at said particular wavelength of light; and the magnitude of said index of refraction of the material of said body, the index of refraction of said reflection control region material at said particular wavelength of light and the extinction coefficient of said body at said particular wavelength of light being such that said first reflectivity of said material and said second reflectivity of said reflection control region are equal within a variation of the order of 0.05.

2. The photon absorber of claim 1 wherein and photon absorber material is tungsten and said reflection control surface region is tungsten oxide.

3. The photon absorber of claim 2 wherein the reflection control surface region is anodized tungsten oxide.

4. The photon absorber of claim 3 wherein said photon absorber material is hillock tungsten.

5. The photon absorber of claim 3 wherein said photon absorber material is dendritic tungsten.

6. A material for absorbing photothermal radiation, said material having a minimized total reflectivity comprising in combination:

an area of tungsten having a surface contour insuring multiple reflections of incident light from the surface thereof, and a contour conforming reflection control region of tungsten oxide with a thickness in the range of 0.035 to 0.075 microns covering at least the portion of said area to be exposed to said photothermal radiation.

7. A material for absorbing photothermal radiation comprising:

an area of tungsten having a surface contour insuring multiple reflections of incident light from the surface thereof, and a contour conforming reflection control region of tungsten oxide having a thickness in the range of 0.035 to 0.075 micrometers formed by the process of anodizing tungsten in phosphoric acid under a voltage of 20 to 40 volts.

* * * * *

UNITED STATES PATENT AND TRADEMARK OFFICE
CERTIFICATE OF CORRECTION

PATENT NO. : 4,448,487
DATED : May 15, 1984
INVENTOR(S) : Cuomo et al

It is certified that error appears in the above-identified patent and that said Letters Patent are hereby corrected as shown below:

Column 1, line 14, "in" should read --to--.

Column 1, line 46, "most" should read --more--.

Column 3, line 66, "$P_{TOTAL}$" should read --$R_{TOTAL}$--.

Column 5, line 48, "rate" should read --ratio--.

Signed and Sealed this

Twenty-sixth Day of March 1985

[SEAL]

Attest:

DONALD J. QUIGG

Attesting Officer    Acting Commissioner of Patents and Trademarks